United States Patent
Nagayama

(10) Patent No.: US 7,478,320 B2
(45) Date of Patent: Jan. 13, 2009

(54) STRUCTURED DOCUMENT PROCESSOR

(75) Inventor: Junichi Nagayama, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 10/880,180

(22) Filed: Jun. 28, 2004

(65) Prior Publication Data
US 2005/0028088 A1 Feb. 3, 2005

(30) Foreign Application Priority Data
Jul. 28, 2003 (JP) ............................. 2003-280638

(51) Int. Cl.
G06F 17/00 (2006.01)
(52) U.S. Cl. ...................... 715/235; 715/237
(58) Field of Classification Search ................ 715/513, 715/517, 243, 234, 235, 200, 237
See application file for complete search history.

(56) References Cited

U.S. PATENT DOCUMENTS

| | | | |
|---|---|---|---|
| 6,026,433 A | 2/2000 | D'Arlach et al. | 709/217 |
| 6,253,216 B1 | 6/2001 | Sutcliffe et al. | 707/500 |
| 6,304,886 B1 * | 10/2001 | Bernardo et al. | 715/530 |
| 6,484,149 B1 * | 11/2002 | Jammes et al. | 705/26 |
| 6,684,369 B1 * | 1/2004 | Bernardo et al. | 715/513 |
| 6,779,153 B1 * | 8/2004 | Kagle | 715/522 |
| 7,039,658 B2 * | 5/2006 | Starkey | 707/203 |
| 7,047,318 B1 * | 5/2006 | Svedloff | 709/246 |
| 7,058,671 B2 * | 6/2006 | Calvo et al. | 715/205 |
| 7,117,436 B1 * | 10/2006 | O'Rourke et al. | 715/205 |
| 7,131,065 B1 * | 10/2006 | Kane | 715/517 |
| 7,152,207 B1 * | 12/2006 | Underwood et al. | 715/207 |
| 7,213,202 B1 * | 5/2007 | Kagle | 715/517 |

(Continued)

FOREIGN PATENT DOCUMENTS

JP 05-101053 4/1993

(Continued)

OTHER PUBLICATIONS

McFarland, Dreamweaver MX: The Missing Manual, Nov. 2002, O'Reilly, pp. 1-76.*

(Continued)

*Primary Examiner*—Stephen Hong
*Assistant Examiner*—Manglesh M Patel
(74) *Attorney, Agent, or Firm*—Stevens & Showalter LLP

(57) ABSTRACT

A structured document processor comprises a document structure analyzing module for analyzing the structure of a predetermined document and a template structure analyzing module for analyzing the structure of a template to be applied to the predetermined document, wherein at least one content area of the template is identified. The processor also comprises a structural component selection accepting module for accepting selection of a structural component of the predetermined document for each identified content area of the template and a template applying module for applying the template to modify the predetermined document by inserting each selected structural component into its corresponding content area. The processor may further comprise a structural component retrieving module for retrieving from at least one additional structured document, a structural component positioned similarly to the structural component of the predetermined document selected for each identified content area, wherein the template is applied to each additional document.

11 Claims, 15 Drawing Sheets

U.S. PATENT DOCUMENTS

| | | | | |
|---|---|---|---|---|
| 2001/0051961 | A1* | 12/2001 | Duxbury | 707/517 |
| 2002/0116413 | A1* | 8/2002 | Clark | 707/513 |
| 2003/0004993 | A1* | 1/2003 | Templeton et al. | 707/513 |
| 2003/0225853 | A1* | 12/2003 | Wang et al. | 709/217 |

FOREIGN PATENT DOCUMENTS

| | | |
|---|---|---|
| JP | 07-056920 | 3/1995 |
| JP | 07-219946 | 8/1995 |
| JP | 09-198370 | 7/1997 |
| JP | 2001209641 A | 1/2000 |
| JP | 2000-076228 | 3/2000 |

OTHER PUBLICATIONS

Bos et al., Cascading Style Sheets, Level 2 revision 1 CSS 2.1 Specification, Jan. 2003, W3C, pp. 1-30.*

David Sawyer McFarland, Dreamweaver MX: The Missing Manual, Nov. 2002, O'Reilly, pgs in PDF format (1-45).*

"Step Up Using Fireworks, Dreamweaver and Flash," Wingraphic vol. 17, No. 17, pp. 96-99.

"Usable Techniques for Office XP", ASAHI PC No. 331, pp. 26-39 (Apr. 15, 2003).

* cited by examiner

FIG. 12

| CONTENT AREA NAME | STRUCTURAL COMPONENT |
|---|---|
| main | HEAD<br>BODY<br>　　TABLE<br>　　TABLE<br>　　　　TBODY<br>　　　　　　TR<br>　　　　　　　　TD<br>　　　　　　　　TD<br>　　　　　　　　TD |

STRUCTURED DOCUMENT PROCESSOR

BACKGROUND OF THE INVENTION

The present invention relates to a structured document processor for processing a structured document composed of one or multiple structural components, and in particular, to a structured document processor for applying a template to a structured document.

There are a number of websites available on the Internet including commercial websites and private websites. Commercial websites typically have elaborate web pages for the purpose of attracting customers. In addition, the web pages may include a uniform design. For example, one format that may be used is a menu list located at the left side of the web pages and a bar with a logo of a company at the top of the web pages.

If the logo of the company is changed, all the web pages included in the website have to be corrected. In the case of a big company, thousands or many thousands of web pages may have to be edited. This requires a great amount of work.

BRIEF SUMMARY OF THE INVENTION

According to one aspect of the present invention, a structured document processor comprises a structural component selection accepting module for accepting selection of a particular structural component among multiple structural components composing a predetermined document, and a template applying module for inserting the particular structural component, selection of which has been accepted by the structural component selection accepting module, into a predetermined content area included in a predetermined template.

According to another aspect of the present invention, a method for processing a structured document comprises accepting selection of a particular structural component among multiple structural components composing a predetermined document stored in predetermined storing module, and inserting the particular structural component, selection of which has been accepted, into a predetermined content area included in a predetermined template stored in predetermined storing module.

According to yet another aspect of the present invention, a computer program product for processing a structural document comprises a computer readable medium having computer readable program code embodied therein. The computer readable program code comprises computer readable program code configured to accept selection of a particular structural component among multiple structural components composing a predetermined document, and computer readable program code configured to insert the particular structural component, selection of which has been accepted, into a predetermined content area included in a predetermined template.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 12 shows an example of the stored contents;

DETAILED DESCRIPTION OF THE INVENTION

Figure 1:
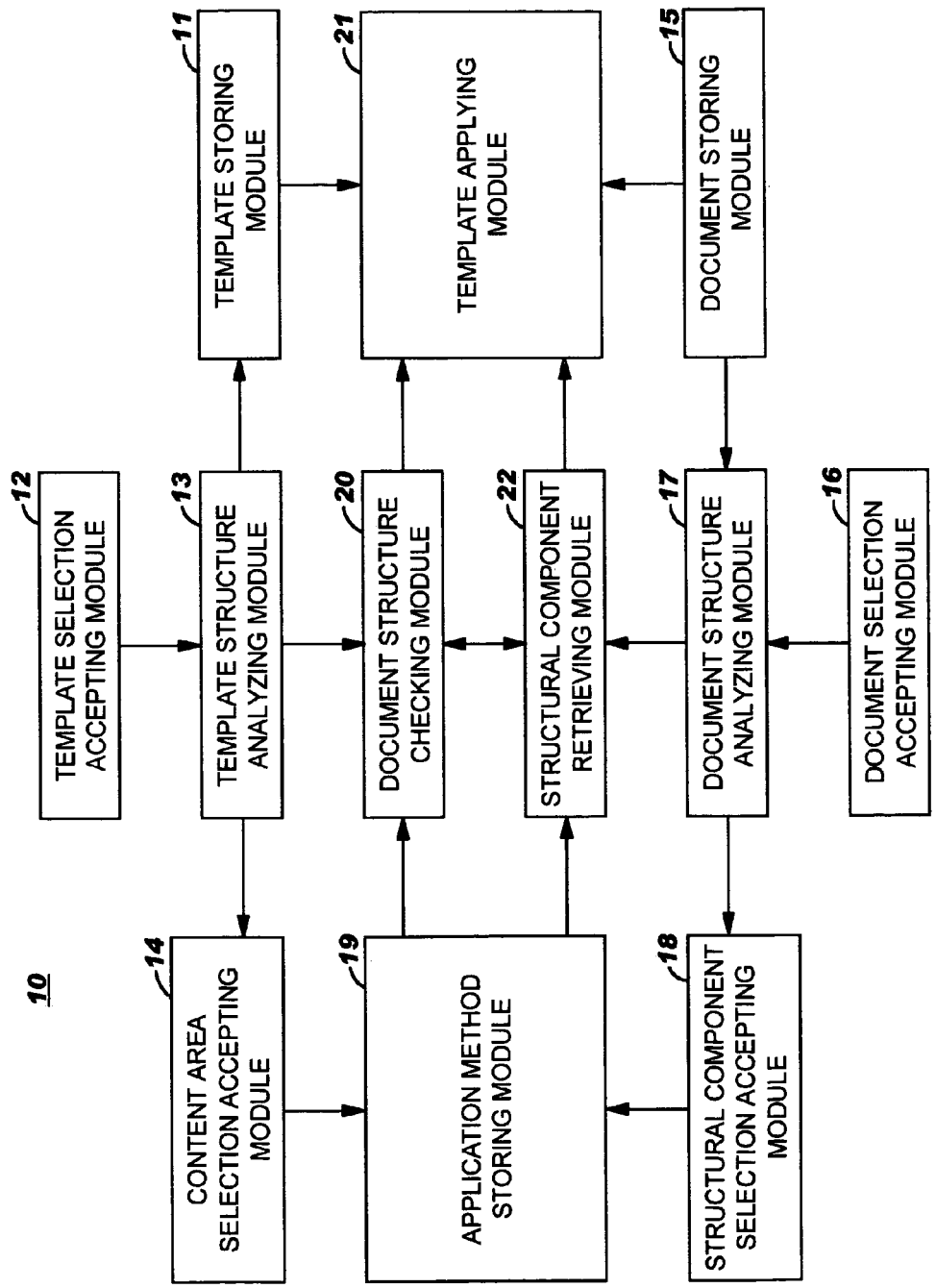
FIG. 1 is a block diagram showing one aspect of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user=s computer and partly on a remote computer or entirely on the remote computer. In the latter scenario, the remote computer may be connected to the user=s computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create module for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction module which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It has been devised to apply a template (model document) to a structured document such as an HTML document realizing a web page. A template provides a uniform layout of a document. It is a model document in which two kinds of areas are specified: an area to be used in common among multiple documents to which the template is applied and an area to be used for freely setting or editing different contents according to documents to which the template is applied (hereinafter referred to as a "content area"). Management of web pages using a template allows, even in the case of change of a logo of a company and the like, all the web pages to which the template is applied to be automatically corrected only by rewriting a file (template) including the logo.

In the Published Unexamined Patent Application No. 2001-209641 (pp. 10-22; FIGS. 2 to 9), a document composition process is performed by extracting document components from a structured document and inserting or substituting each of the document components in a template. However, it is necessary to embed a label in a one-to-one correspondence to each of a template and a structured document, and it is impossible to use a general-purpose template or apply a template to a structured document without a label embedded therein.

There is provided a product for assisting application of a template to a document, such as a HTML document, when creating a web page. However, the following restrictions are imposed on use of such a product: the first restriction is that a portion to be inserted in the content area can be specified only for the entire document; the second is that a document can be inserted into only one content area even if there are multiple content areas in a template; and the third is that a template can be applied to only one document and cannot be applied to multiple documents at the same time.

As shown in FIG. 1, a structured document processor 10 is provided with a template storing module 11, a template selection accepting module 12, a template structure analyzing module 13, a content area selection accepting module 14, a document storing module 15, a document selection accepting module 16, a document structure analyzing module 17, a structural component selection accepting module 18, an application method storing module 19, a document structure checking module 20, a template applying module 21 and a structural component retrieving module 22.

The template storing module 11 is a module for storing a structured document used as a template (hereinafter, simply referred to as a "template") and the template selection accepting module 12 is a module for accepting information identifying a template selected by a user. The template structure analyzing module 13 is a module for analyzing the document structure of a specified template, and the content area selection accepting module 14 is a module for accepting selection of a particular content area among content areas in a template.

The document storing module 15 is a module for storing a structured document to which a template is to be applied (hereinafter, simply referred to as a "document") and the document selection accepting module 16 is a module for accepting information identifying a document selected by a user. The document structure analyzing module 17 is a module for analyzing the structure of a specified document, and the structural component selection accepting module 18 is a module for accepting selection of a particular structural component among structural components composing a document.

The application method storing module 19 is a module for storing information about a content area for which selection has been accepted by the content area selection accepting module 14 and information about a structural component for which selection has been accepted by the structural component selection accepting module 18 in association with each other. The document structure checking module 20 is a module for checking whether insertion of a specified structural component into a specified content area is valid from a structural viewpoint of the document. The template applying module 21 is a module for applying a template on a memory. The structural component retrieving module 22 is a module for retrieving a structural component similar to a structural component stored in the application method storing module 19 from among structural components included in the result of analysis by the document structure analyzing module 17.

A hardware configuration similar to that for a general computer system may be adopted for a structured document processor according to one embodiment. That is, any configuration may be adopted using a central processing unit (CPU) and a main memory, which may be connected to an auxiliary storage device via a bus. The auxiliary storage may comprise a hard disk, flexible disk, MO (magneto-optical disk), CD-ROM and the like.

A computer program for realizing this embodiment may be stored in the auxiliary storage device. By the central processing unit (CPU) reading the computer program into the main memory and executing it, there is realized each of the template selection accepting module 12, the template structure analyzing module 13, the content area selection accepting module 14, the document selection accepting module 16, the document structure analyzing module 17, the structural component selection accepting module 18, the document structure checking module 20, the template applying module 21 and the structural component retrieving module 22. Each of the template storing module 11, the document storing module 15 and the application method storing module 19 may be realized with the use of the auxiliary storage device or with the use of the main memory.

Figure 3:
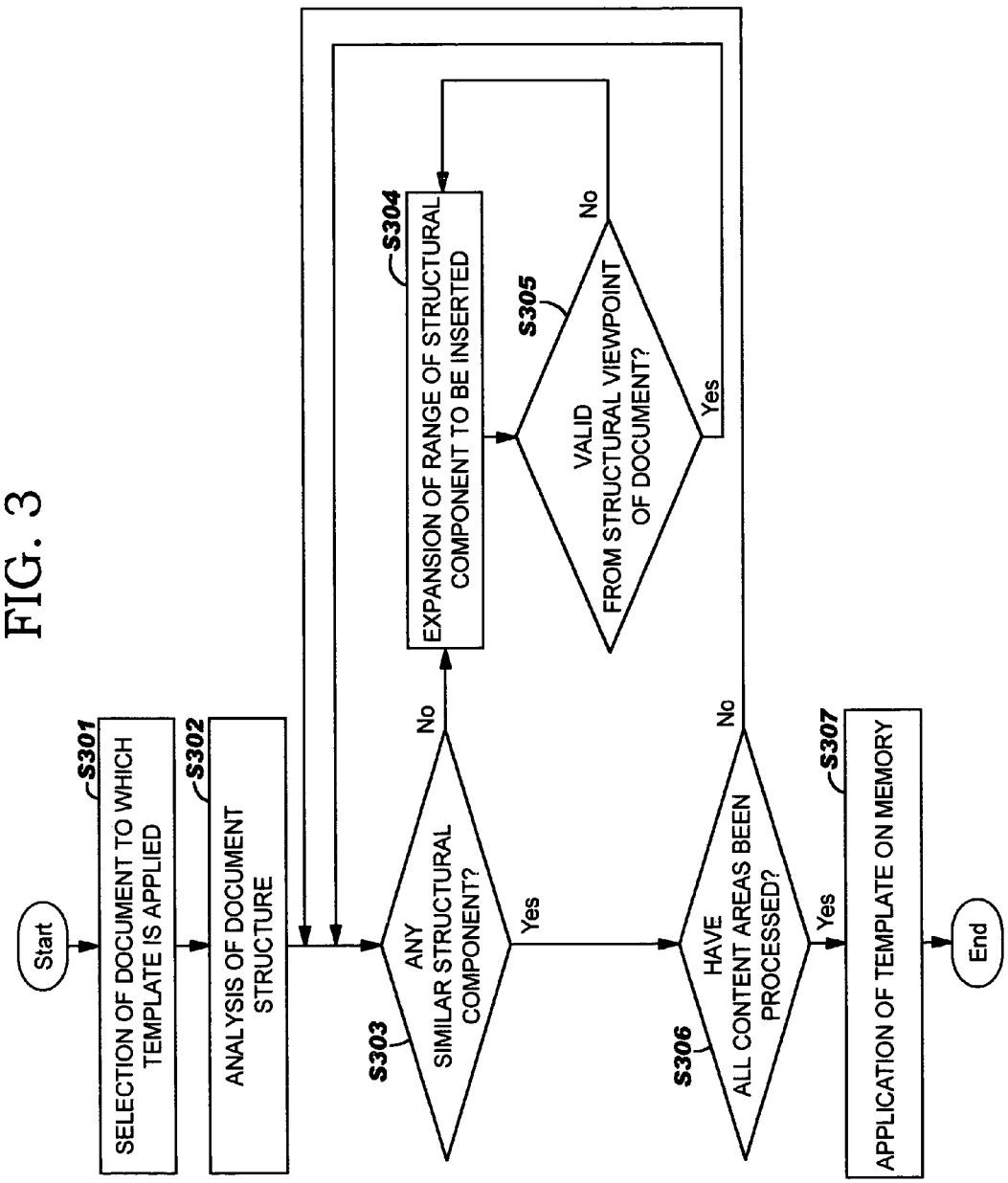
FIG. 3 is a flowchart showing the operation of applying a template to another document.

Referring also to FIG. 3, if it is not determined that there is any appropriate structural component, then the structural component included in the association information which is stored in the application method storing module 19 is changed to a higher-level structural component (step 304) (hereinafter, such change of a structural component is referred to as "expansion"). The structural component retrieving module 22 determines whether the expansion is valid from a structural viewpoint of the document (step 305). If the expansion is not valid from a structural viewpoint of the document, then the process returns to step 304 and tries expansion of the structural component range again. If the expansion is valid from a structural viewpoint of the document, the process proceeds to step 303, where it is determined whether there is any structural component positioned similarly to the structural component after expansion, among structural components included in the result of the analysis by the document structure analyzing module 17 (step 303).

If it is determined that there is any appropriate structural component at step 303, then information about association between information about a content area and information about the structural component (information indicating which structural component should be inserted into which content area in the new document) is retained, and it is determined whether retrieval of a structural component to be inserted has been performed for all the content areas (step 306). If it is not determined that retrieval has been performed for all the content areas, then steps 303 to 305 are performed for the other content areas. If it is determined that retrieval has been performed for all the content areas, then the process proceeds to step 307. Eventually, the template applying module 21 applies the template on a memory based on the information about a structural component to be inserted for all the content areas (step 307).

Figure 4:
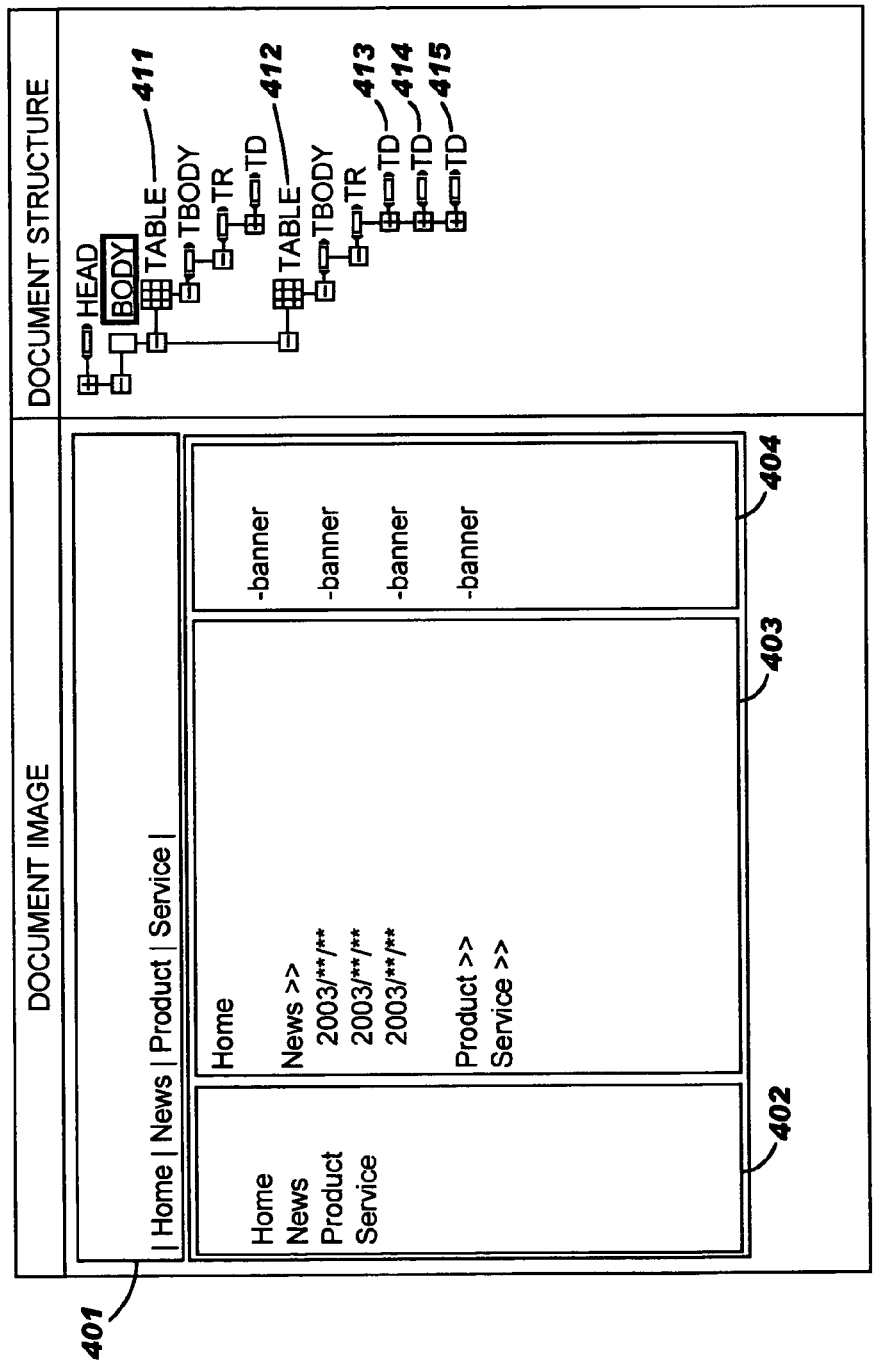
FIG. 4 describes a document according to one aspect of the present invention.
Figure 5:
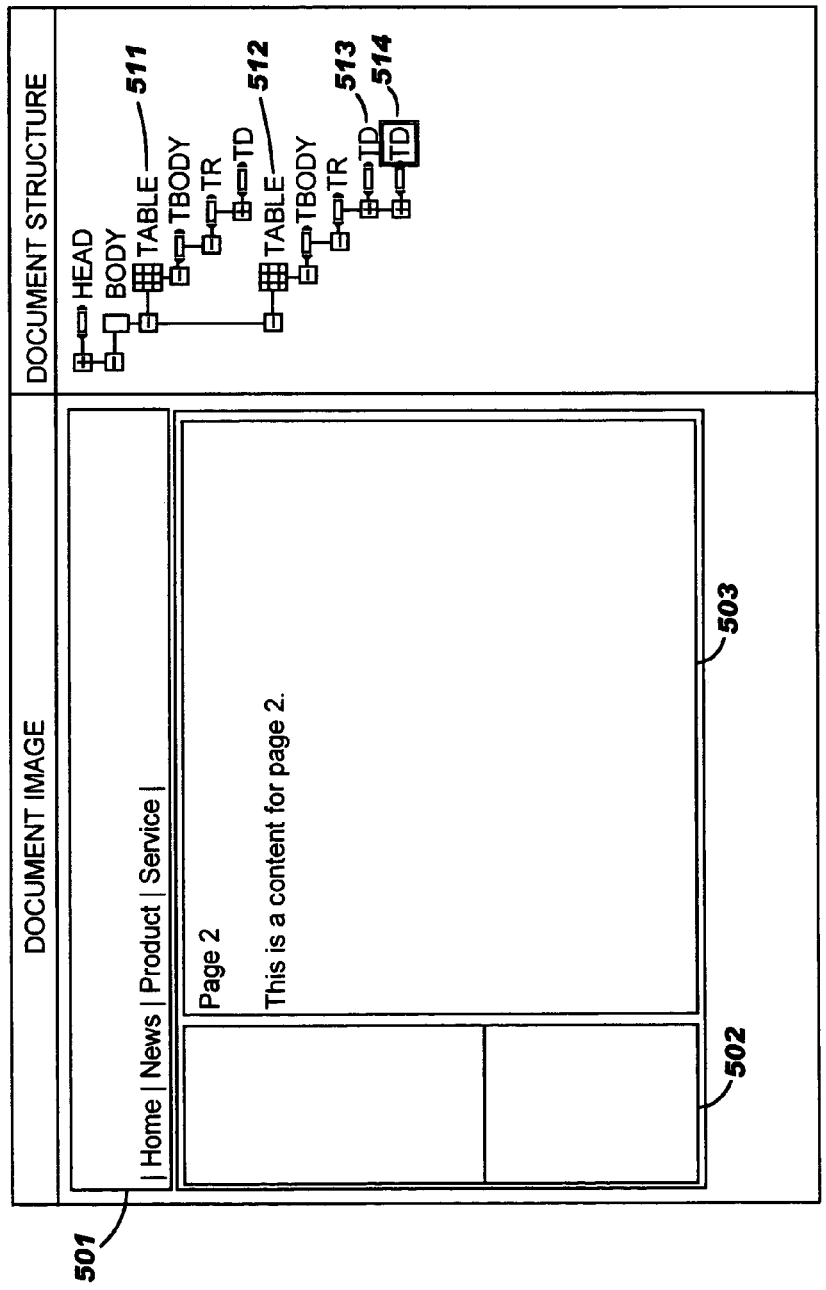
FIG. 5 describes a document according to another aspect of the present invention.
Figure 6:
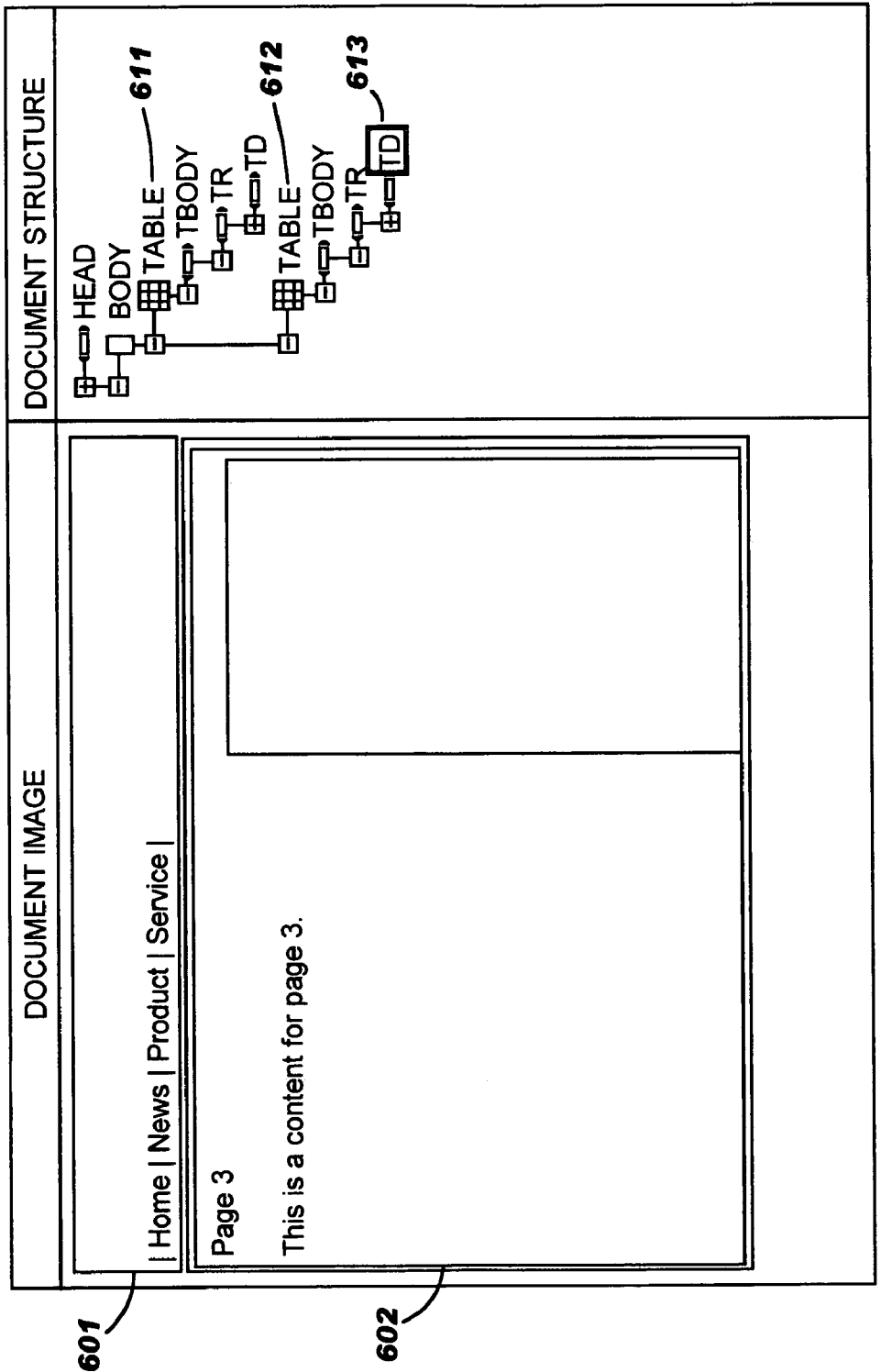
FIG. 6 describes a document according to yet another aspect of the present invention.

The operation of one embodiment will be described below in detail using a specific example. In this specific example, documents shown in FIGS. 4 to 6 will be used as those to which a template is applied. In FIGS. 4 to 6, a display image of a document is shown on the left side. That is, it is assumed that an HTML document which realizes such a display is stored in the document storing module 15. In FIGS. 4 to 6, the structure of the document is also shown on the right side. However, it is assumed that the structure of the document is to be generated by the document structure analyzing module 17 when the document is selected, as described later.

In the document shown in FIG. 4 ("index.html"), an area 401 corresponds to <TABLE> 411; an area including areas 402 to 404 corresponds to <TABLE> 412; and the areas 402, 403 and 404 correspond to <TD> 413, 414 and 415, respectively. In the document shown in FIG. 5 ("page2.html"), an area 501 corresponds to <TABLE> 511; an area including areas 502 and 503 corresponds to <TABLE> 512; and the areas 502 and 503 correspond to <TD> 513 and 514, respectively. In the document ("page3.html") shown in FIG. 6, an area 601 corresponds to <TABLE> 611, and an area 602 corresponds to <TABLE> 612 as a frame and to <TD> 613 as content.

Figure 7:
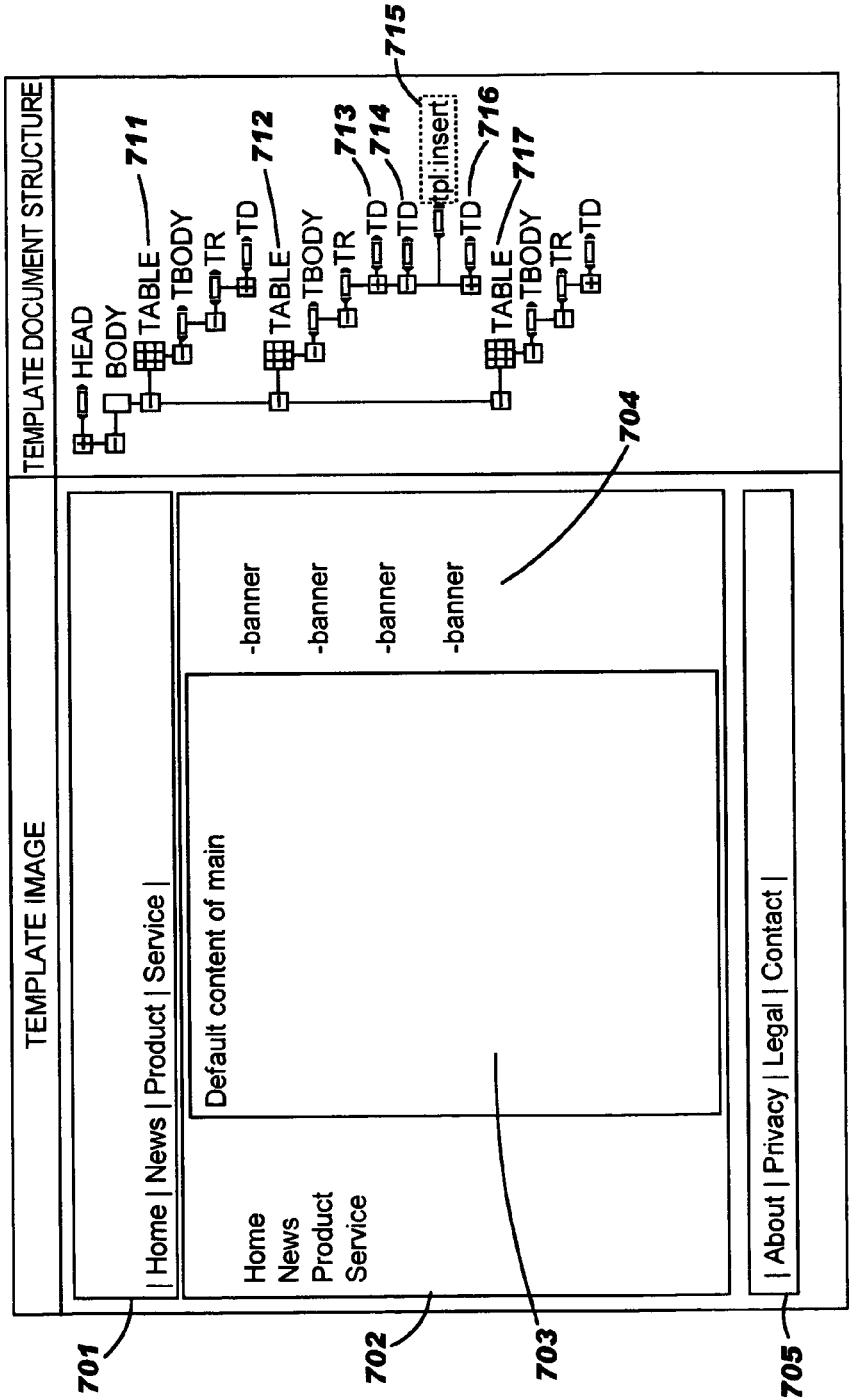
FIG. 7 describes a template according to one aspect of the present invention.

In this specific example, a template shown in FIG. 7 will be used as a template applied to the above-mentioned documents. In FIG. 7, a display image of the template is shown on the left side. That is, it is assumed that an HTML document which realizes such a display is stored in the template storing module 11. In FIG. 7, the document structure of the template is also shown on the right side. However, it is assumed that the document structure of the template is to be generated by the template structure analyzing module 13 when the template is selected, as described later.

In the template shown in FIG. 7 ("template.htpl"), an area 701 corresponds to <TABLE> 711; an area including areas 702 to 704 corresponds to <TABLE> 712; the areas 702, 703 and 704 correspond to <TD> 713, 714 and 716, respectively; and an area 705 corresponds to <TABLE> 717. The template also includes information indicating content areas. This information can be realized as a special tag put in an HTML tag, for example. In the example in FIG. 7, a special tag <tpl:insert> 715 is put in an HTML tag <td> to indicate that the area 703 corresponding to the <TD> 714 is a content area.

Furthermore, identification information such as the name of the content area is also described in the tag 715, though it is not shown in FIG. 7. On the assumption of the description above, specific description will be made on the operation of applying a template to a single document shown in the flowchart in FIG. 2.

Figure 2:
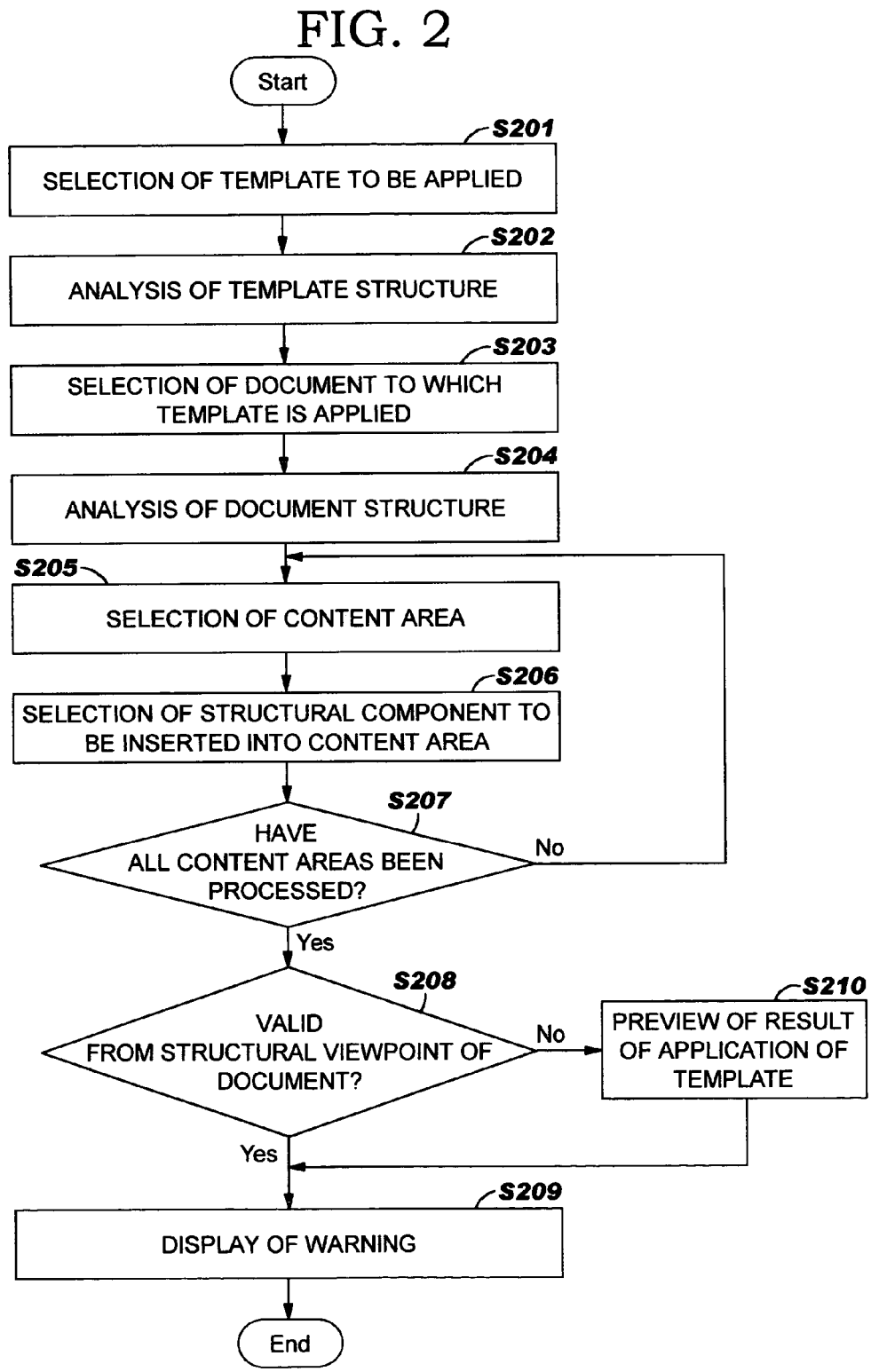
FIG. 2 is a flowchart showing the operation of applying a template to a single document.

The document preselection step may be executed in advance to select some documents to which the template is to be applied, from among a lot of documents that exist in the structured document processor and store them in the document storing module 15. It is assumed here that the above-mentioned documents "index.html", "page2.html" and "page3.html" are stored in the document storing module 15 via such a processing. The process shown in FIG. 2 is then started.

Figure 8:
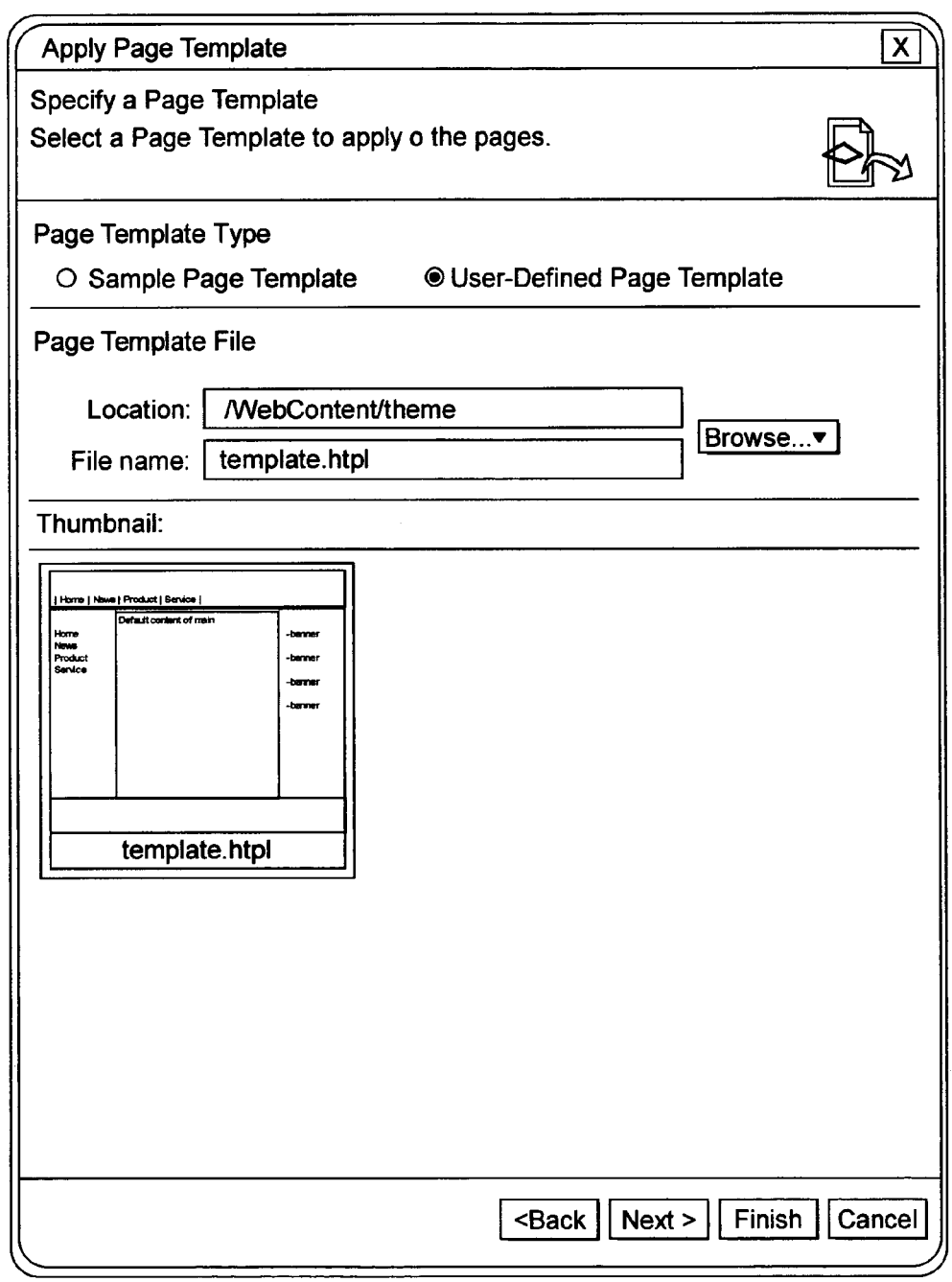
FIG. 8 shows an example of a screen according to one aspect of the present invention.

The screen image at the start of the process is shown in FIG. 8. On the screen in FIG. 8, either a sample template or a user-defined template can be specified as a template type. A user-defined template is specified here, as shown in the figure. A thumbnail of a selectable template "template.htpl" is then displayed in the lowest area. Though only one template is displayed since only one template is assumed in this specific example, multiple thumbnails are displayed when multiple templates are assumed.

If the user clicks the thumbnail of the "template.htpl", the location of the template "/WebContent/theme" and its file name "template.htpl" are displayed on the area immediately above the thumbnail, and information identifying the selected template is sent to the structured document processor. In response to this, the template selection accepting module 12 accepts the information (step 201).

At this point of time, the template structure analyzing module 13 analyzes the structure of the selected template (step 202), though it is not shown on the screen display. Specifically, there is generated information about the document structure of the template, which is shown on the right side of FIG. 7.

Figure 9:
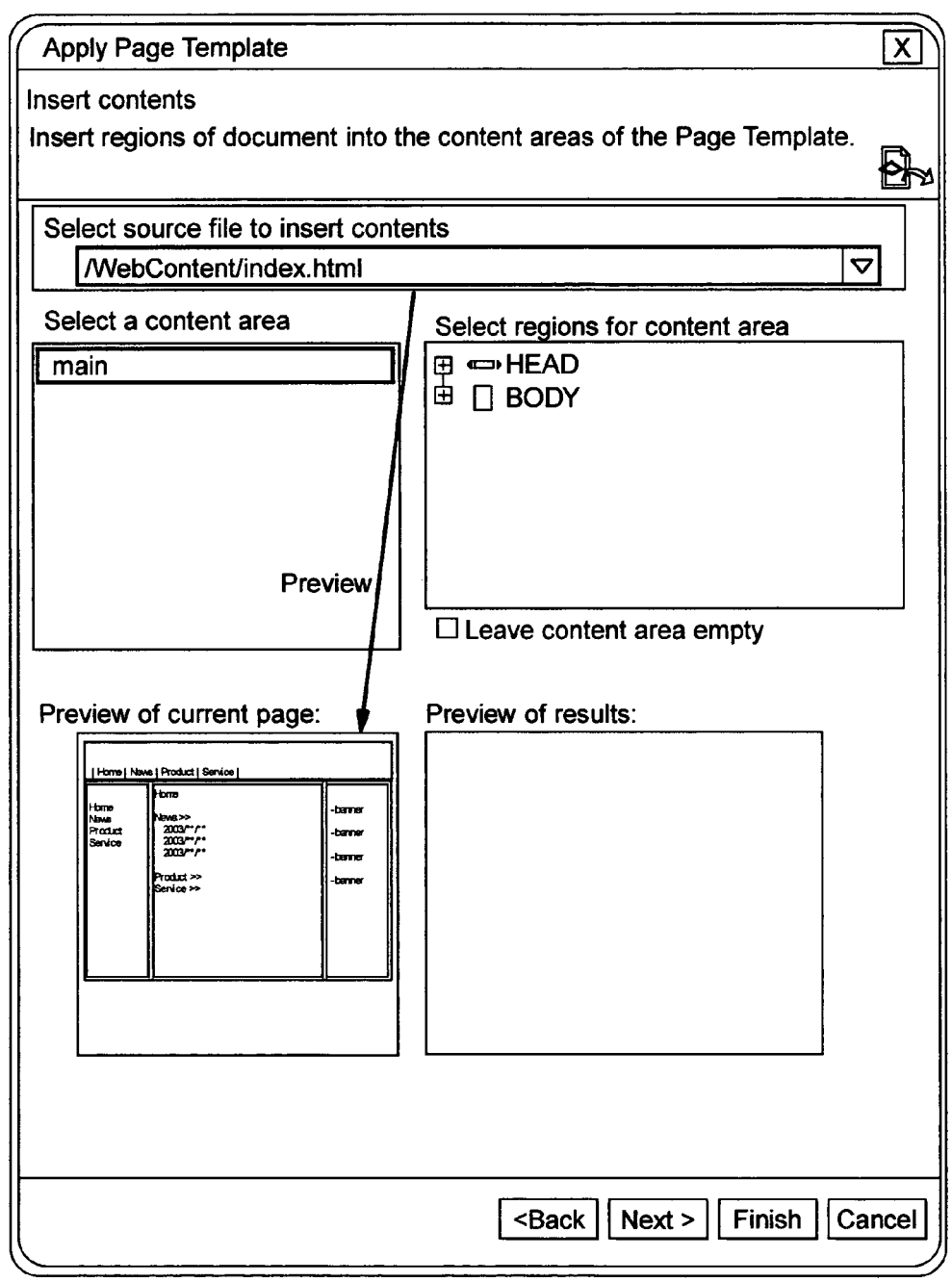
FIG. 9 shows an example of a screen according to another aspect of the present invention.
Figure 10:
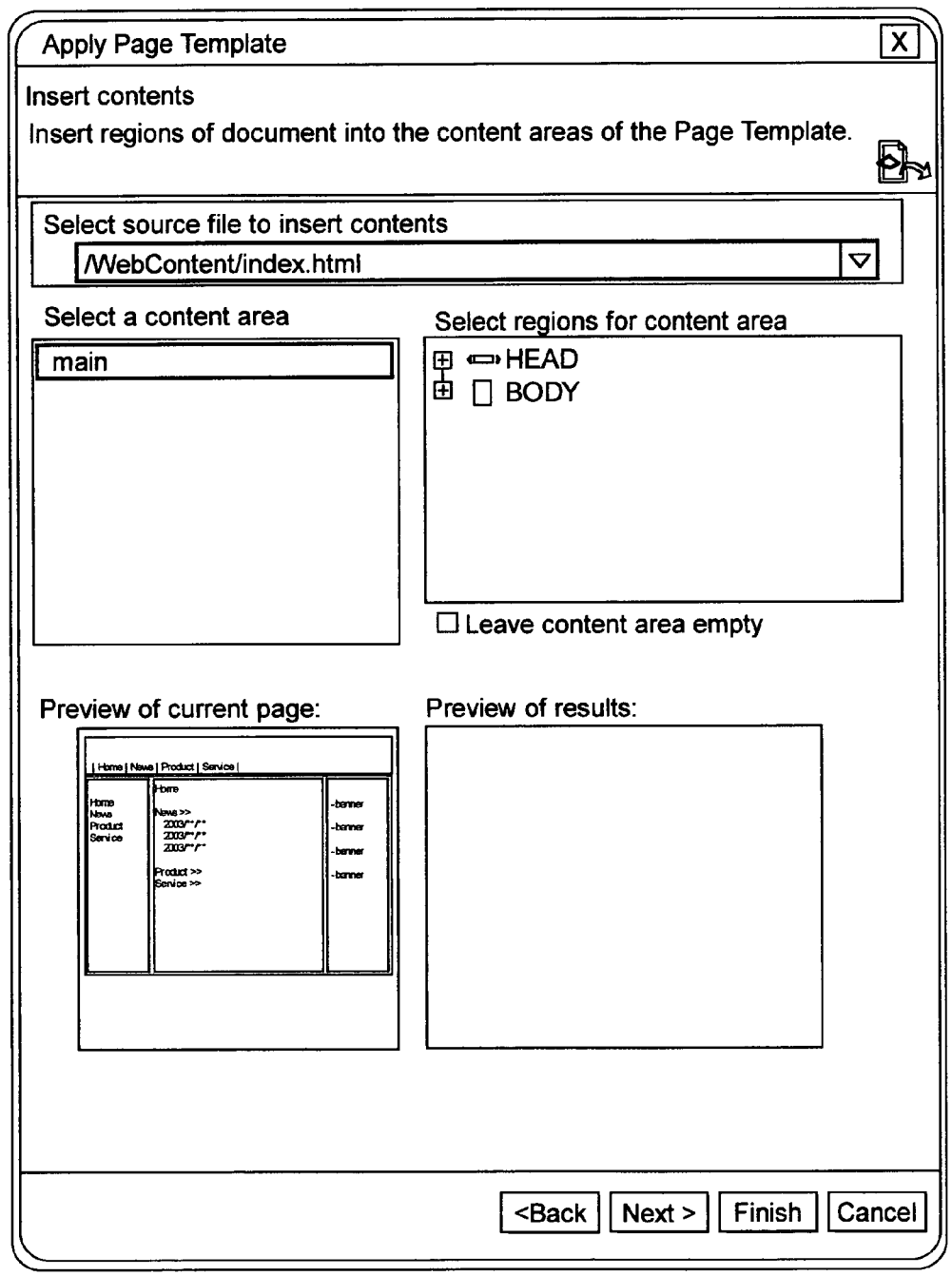
FIG. 10 shows an example of a screen according to yet another aspect of the present invention.
Figure 11:
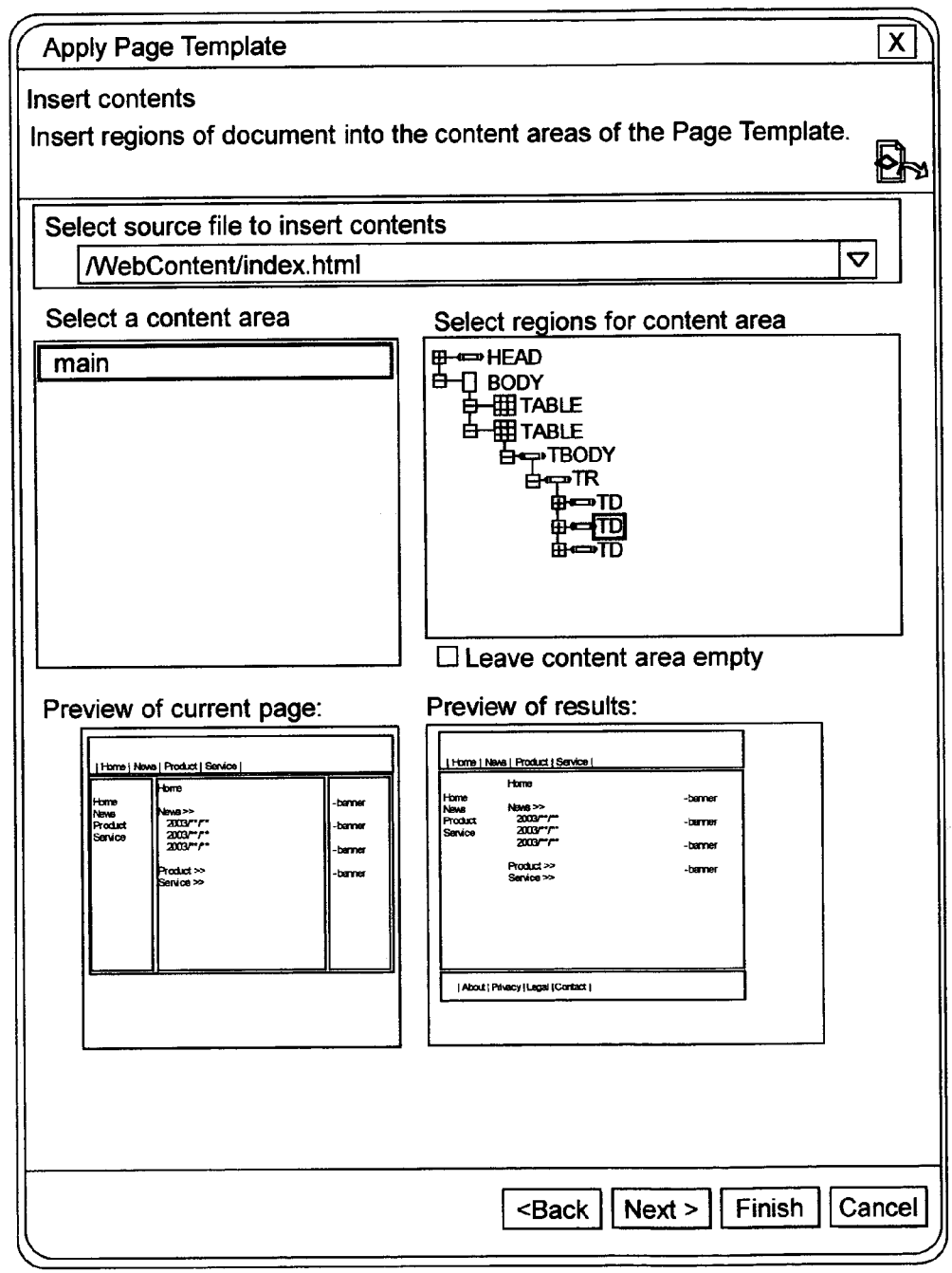
FIG. 11 shows an example of a screen according to a further aspect of the present invention.

After or in parallel with the processing at step 202, there is displayed a screen for specifying which structural components should be inserted in which content areas in the selected template (a screen in a format shown in FIGS. 9 to 11). There is included information indicating that a content area "main"

exists in the template "template.htpl", in the document structure of the template generated by the template structure analyzing module 13 at step 202, so that the "main" is displayed as a selectable content area when the screen is initially displayed. Though only one content area name is displayed since a template with only one content area is used in this specific example, multiple content area names are displayed if a template with multiple content areas is used.

The user first specifies which document the template is to be applied to on this screen. FIG. 9 shows the screen image to be displayed then. By clicking the downward triangle mark at the right end of the area surrounded by a heavy line in FIG. 9, information for identifying selectable documents ("/WebContent/index.html", "/VWebContent/page2.html" and "WebContent/page3.html") is displayed, and "/WebContent/index.html" is selected here as shown in the figure. A preview image of the selected document is displayed in the lower left area, as indicated by a "Preview" arrow, and information identifying the selected document is sent to the structured document processor. In response to this, the document selection accepting module 16 accepts the information (step 203).

At this point, the document structure analyzing module 17 analyzes the structure of the selected document, though it is not shown on the screen display (step 204). Specifically, there is generated information about the document structure, which is shown on the right side of FIG. 4.

Furthermore, information about structural components composing the document "index.html" is included in the document structure, which is the result of analysis by the document structure analyzing module 17, so that the information about structural components composing the document "index.html" is displayed in the area on the right in the middle. Only the structural component in the highest-level hierarchy is displayed in the initial display.

The user then selects a content area to which a structural component should be inserted. The screen image at this point of time is shown in FIG. 10. The content area "main" is selected in the area surrounded by a heavy line in FIG. 10. Information identifying the selected content area is then sent to structured document processor, and the content area selection accepting module 14 accepts the information (step 205).

The user then selects a structural component to be inserted in the selected content area from a tree indicating the document structure. FIG. 11 shows the screen image to be displayed then. By sequentially following <BODY>, the second <TABLE> thereunder, the first <TBODY> thereunder, and then the first <TR> thereunder in the area surrounded by a heavy line in FIG. 11, there is provided a screen display as shown in the figure. The second <TD> under <TR>, that is, the <TD> 414 in FIG. 4 is selected here, as shown in the figure. Information identifying the selected structural component is then sent to the structured document processor, and the structural component selection accepting module 18 accepts the information (step 206).

In this specific example, since there is only one content area that exists in the template "template.htpl" and there is no unprocessed content area (YES at step 207), the document structure checking module 20 then determines whether insertion of the structural component <TD> 414 into the content area "main" in the template "template.htpl" is valid from a structural viewpoint of the document (step 208). It is determined that the insertion is valid from a structural viewpoint of the document here by a processing to be described later, so that the template applying module 21 applies the template, and a preview as shown in the lower right area in FIG. 11 is displayed (step 209).

In this embodiment, the information about association between the information about the content area selected at step 205 and the information about the structural component selected at step 206 is stored in the application method storing module 19, and FIG. 12 shows an example thereof. In FIG. 12, the name of a content area is stored as information about the content area. As information about a structural component, information about the document structure excluding structural components in the document structure which are not passed to reach the structural component. However, this is only an example, and any information may be stored only if it can identify which structural component has been inserted in which content area. For example, template structure information including the content area information may be stored as the content area information, instead of the name of the content area.

The validity check from a structural viewpoint of the document at step 208 is performed as follows. First, by referring to the result of the analysis of the template structure by the template structure analyzing module 13, the document structure checking module 20 recognizes that the content area "main" is a content area put in <TD>. Furthermore, by referring to the application method storing module 19, it is known that the structural component to be inserted is the <TD>. Accordingly, the document structure checking module 20 checks whether the <TD> itself of document can be inserted into the <TD> of the template. As a result of the checking, it is determined that the insertion is impossible. Then, as a result of checking whether the content of <TD> of the document can be inserted into the <TD> of the template, it is determined that the insertion is possible. Therefore, the document structure checking module 20 determines that insertion of the structural component <TD> 414 into the content area "main" is valid from a structural viewpoint of the document.

On the contrary, if it is attempted to insert the <TR> into a content area put in the <TD>, for example, then it is determined to be invalid from a structural viewpoint of the document at step 208, and a warning is displayed (step 210).

Though it is assumed in the above description that the document structure checking module 20 refers to the information stored in the application method storing module 19 and the result of analysis by the template structure analyzing module 13 when checking the validity from a structural viewpoint of the document, it is possible to check validity from a structural viewpoint of the document without referring to the result of analysis by the template structure analyzing module 13 in the case where there is stored association between the template structure information and the document structure information in the application method storing module 19.

Figure 13:
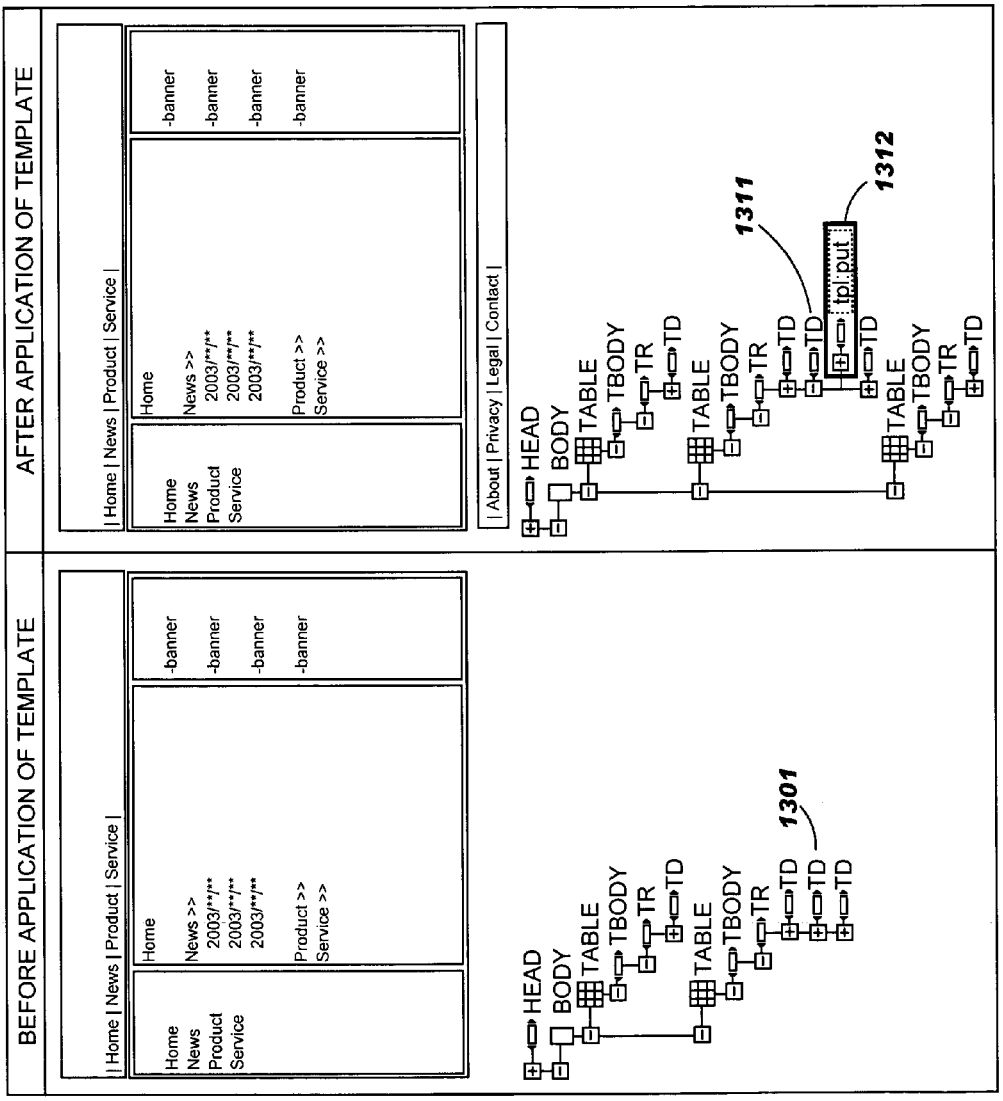
FIG. 13 shows a document before application of the template and a document after application of the template.

As a result of applying the template to the document through the process described above, the document "index.html" is changed as shown in FIG. 13. That is, there is put a <tpl:put> tag, a special tag indicating that a structural component has been inserted in <TD> 1311, as shown in the document structure after application of the template. Description corresponding to the <TD> 1301 is provided in the <tpl:put> tag, though it is not shown.

Then, specific description will be made on the operation of applying the template to another document shown in the flowchart in FIG. 3. Conceiving the application of the template to the document "index.html" described above as a master case (application of a template to one particular document for the purpose of specifying the method of the template application to be performed for other documents) here, description will be made on the case where similar application is performed for the other documents "page2.html" and "page3.html".

Figure 14:
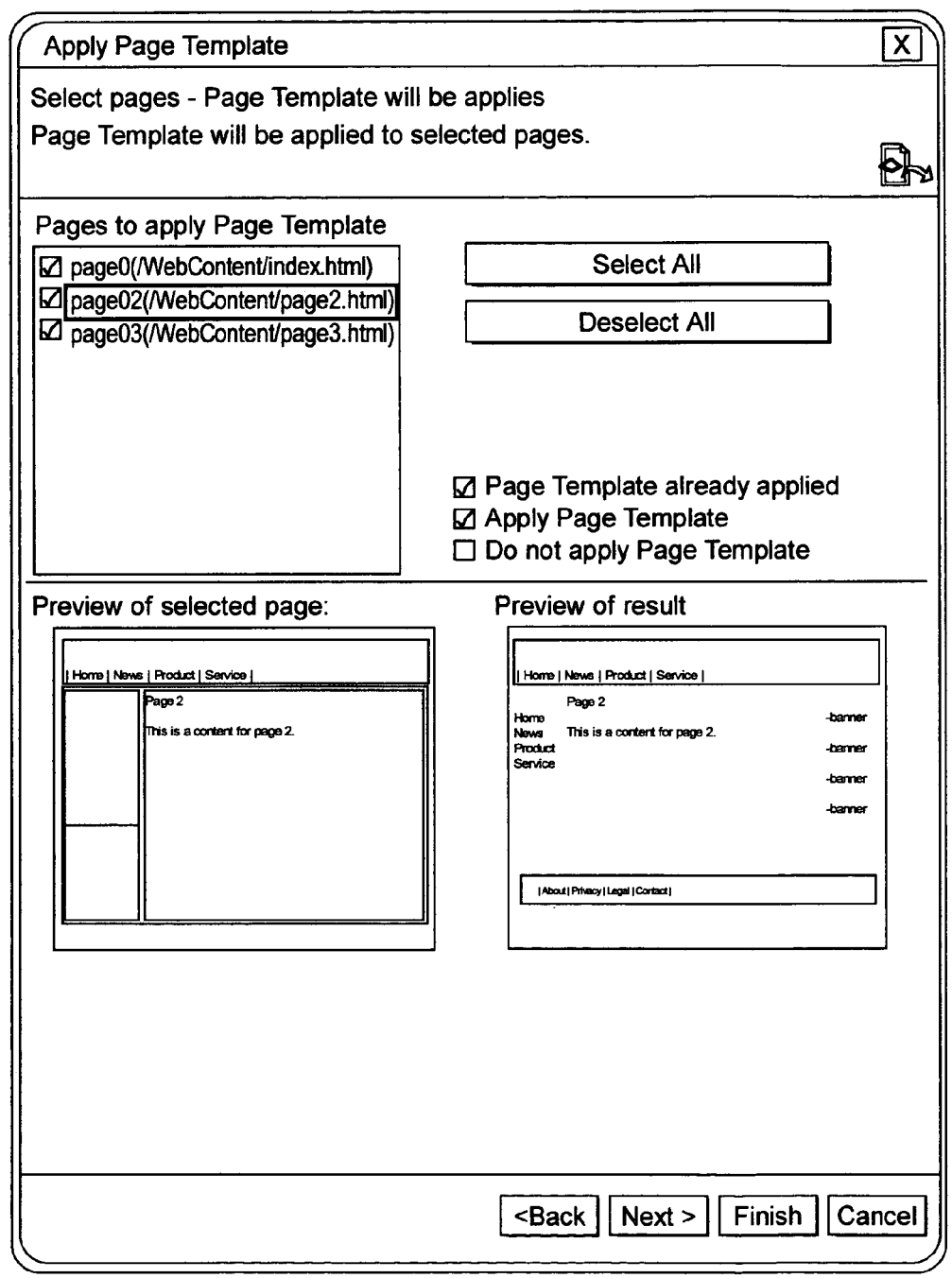
FIG. 14 shows an example of a screen according to a still further aspect of the present invention.

First, description will be made on application of the template to the document "page2.html" shown in FIG. 5. FIG. 14 shows the screen image to be displayed then. Though all the documents "index.html", "page2.html" and "page3.html" are checked in FIG. 14, description will be made by focusing attention only on the document "page2.html" here. By checking the document "page2.html" to which the template is applied in the lower left area in FIG. 14, the "page2.html" is selected. Then, information identifying the document "page2.html" is sent to the structured document processor, and the document selection accepting module 16 accepts the information (step 301). The document structure analyzing module 17 then analyzes the structure of the document "page2.html" (step 302). Specifically, there is generated information about the document structure, which is shown on the right side of FIG. 5.

The structural component retrieving module 22 then retrieves a structural component similar to that shown in the application method stored in the application method storing module 19, from among structural components included in the result of analysis by the document structure analyzing module 17 (step 303). It is shown in the application method storing module 19 that the second <TD> under the first <TR> under the first <TBODY> under the second <TABLE> under <BODY> has been inserted into the content area "main" as shown in FIG. 12. Accordingly, the structural component retrieving module 22 retrieves a structural component positioned similarly to this <TD>, from the document structure on the right side of FIG. 5, which is the result of analysis by the document structure analyzing module 17. In this case, it is recognized that the <TD> 514, which is the second <TD> under the first <TR>under the first <TBODY> under the second <TABLE> under <BODY>, also exists in the document structure on the right side of FIG. 5. There is no content area other than the "main" (YES at step 306), so that the template applying module 21 performs only insertion of the <TD> 514 into the content area "main" on a memory (step 307), and a preview image as shown in the lower right area in the FIG. 14 is then displayed.

As a result of application of the template to the document through the process described above, the document structure of the document "page2.html" is similar to that shown in FIG. 1. However, description corresponding to the <TD> 514 in FIG. 5 is provided in the <tpl:put> tag.

Figure 15:
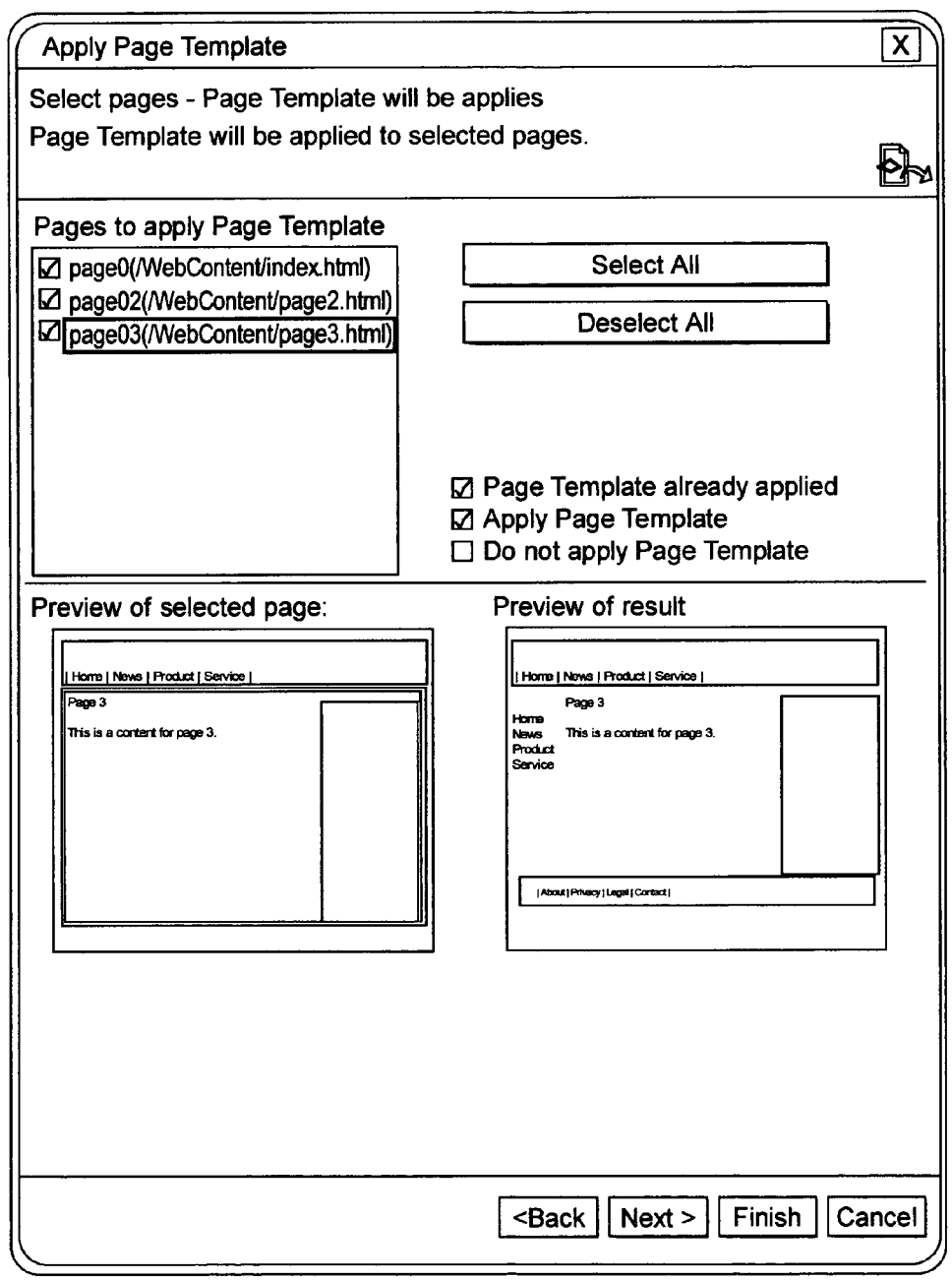
FIG. 15 shows an example of a screen according to an aspect of the present invention.

Next, description will be made on application of the template to the document "page3.html" shown in FIG. 6. FIG. 15 shows the screen image to be displayed then. Though all the documents "index.html", "page2.html" and "page3.html" are checked in FIG. 15, description will be made by focusing attention only on the document "page3.html" here. By checking the document "page3.html" to which the template is applied in the lower left area in FIG. 15, the document "page3.html" is selected. Then, information identifying the document "page3.html" is sent to the structured document processor, and the document selection accepting module 16 accepts the information (step 301). The document structure analyzing module 17 then analyzes the structure of the document "page3.html" (step 302). Specifically, there is generated information about the document structure, which is shown on the right side of FIG. 6.

The structural component retrieving module 22 then retrieves a structural component similar to that shown in the application method stored in the application method storing module 19, from among structural components included in the result of analysis by the document structure analyzing module 17 (step 303). It is shown in the application method storing module 19 that the second <TD> under the first <TR> under the first <TBODY> under the second <TABLE> under <BODY> has been inserted into the content area "main" as shown in FIG. 12. Accordingly, the structural component retrieving module 22 retrieves a structural component positioned similarly to this <TD> from the document structure on the right side of FIG. 6, which is the result of analysis by the document structure analyzing module 17.

In this case, there is not found a structural component corresponding to the second <TD> under the first <TR> under the first <TBODY> under the second <TABLE> under <BODY> in the document structure on the right side of FIG. 6, and therefore, the structural component retrieving module 22 saves the contents of the information shown in FIG. 12, for example, and temporarily expands the insertion range (step 304). That is, the application method is rewritten with a method specifying that the first <TR> under the first <TBODY> under the second <TABLE> under <BODY> should be inserted into the content area "main".

The structural component retrieving module 22 then determines whether the expansion is valid from a structural viewpoint of the document (step 305). Specifically, by referring to the structure information, the result of analysis by the template structure analyzing module 13, the structural component retrieving module 22 recognizes that the content area "main" is put in the HTML tag <td>. Since the <TR> cannot be inserted into the <td>, the structural component retrieving module 22 determines that the expansion is not valid from a structural viewpoint of the document and re-expands the insertion range (step 304). That is, the template application method is rewritten with a method specifying that the first <TBODY> under the second <TABLE> under <BODY> should be inserted into the content area "main".

Next, the structural component retrieving module 22 determines whether the expansion is valid from a structural viewpoint of the document (step 305). The content area "main" is put in the HTML tag <td>, and it is impossible to insert the <TBODY> into the <td>. Therefore, the structural component retrieving module 22 determines that the expansion is not valid from a structural viewpoint of the document and re-expands the insertion range again (step 304). That is, the template application method is rewritten with a method specifying that the second <TABLE> under <BODY> should be inserted into the content area "main".

The structural component retrieving module 22 determines whether the expansion is valid from a structural viewpoint of the document (step 305). The content area "main" is put in the HTML tag <td>, and it is possible to insert the <TABLE> into the <td>. Therefore, the structural component retrieving module 22 determines that the expansion is valid from a structural viewpoint of the document, and retrieves a structural component positioned similar to the <TABLE> from the document structure on the right side of FIG. 6, which is the result of analysis by the document structure analyzing module 17. In this case, there also exists <TABLE> 612, which is the second <TABLE> under <BODY> in the document structure on the right side of FIG. 6. There is no content area other than the "main" (YES at step 306), so that the template applying module 21 performs only insertion of the <TABLE> 612 into the content area "main" on a memory (step 307), and a preview image as shown in the lower right area of the FIG. 15 is then displayed.

As a result of application of the template to the document through the process described above, the document structure of the document "page3.html" is similar to that shown in FIG. 13. However, description corresponding to the <TABLE> 612 in FIG. 6 is provided in the <tpl:put> tag.

A specific example of this embodiment has been described. Though it has not been mentioned in detail how the result of analysis by the template structure analyzing module 13 is retained in the above description, the template structure analyzing module 13 may analyze the template stored in the template storing module 11 to acquire template structure information each time the template structure information is required. Alternatively, the template structure information may be expanded on a memory when it is initially generated so that the structure information expanded on a memory can be used for subsequent processings.

Similarly, the result of analysis by the document structure analyzing module 17 may be also acquired by analyzing the document stored in the document storing module 15 each time the analysis result is required. Alternatively, the document structure information may be expanded on a memory when it is initially generated so that the structure information expanded on a memory can be used for subsequent processings.

Furthermore, though the validity check from a structural viewpoint of the document at step 305 is performed by the structural component retrieving module 22 in this embodiment, it is also possible that the information about the structural component after expansion is passed to the document structure checking module 20 and the document structure checking module 20 performs the validity check by referring to the result of analysis by the template structure analyzing module 13.

In this embodiment, the template applying module 21 applies a template on a memory and a preview of the states of the document before/after the application of the template is provided so that the risk of losing document information due to the application of the template is minimized. However, application of a template by the template applying module 21 can be performed not on a memory but on a hard disk.

By performing the process following the flowchart in FIG. 2, it is possible to specify a structural component (HTML tag) as a portion to be inserted into a content area when applying a template. Furthermore, by performing the process following the flowchart in FIG. 2, it is also possible to specify a different structural component (HTML tag) for each content area when the template is provided with multiple content areas. Furthermore, by performing the process following the flowchart in FIG. 3, it is possible to specify a portion to be inserted in a content area for a single document to automatically apply the template to multiple documents.

The flowchart and block diagrams of FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is apparent to one skilled in the art that numerous modifications and departures from the specific embodiments described herein may be made without departing from the spirit and scope of the invention.

That which is claimed is:

1. A method for processing a structured documents comprising:

selecting a predetermined graphical template;

analyzing the structure of said predetermined graphical template and identifying at least one content area for setting or editing different contents according to documents to which said predetermined template is applied and at least one common area to be used in common among said documents to which said predetermined template is applied;

selecting a first structured document that said predetermined graphical template is to be applied to;

analyzing the structure of said first structured document so as to identify various structural components of said first structured document;

selecting at least one content area of said predetermined template;

selecting a particular structural component of said first structured document to be inserted into each selected content area of said predetermined template;

storing an association between template structure information and document structure information for each selected content area and the corresponding selected particular structural component;

applying said predetermined structural template to said first structured document so as to insert each said particular structural component into the corresponding selected content area of said predetermined template and to include said at least one common area of said predetermined template into said first structured document; and performing for a plurality of additional documents;

selecting a next one of said plurality of additional structured documents;

analyzing the structure of said next one of said plurality of additional structured documents so as to identify various structural components thereof;

using the stored associations between template structure information and document structure information to automatically select a similarly situated structural component of said next one of said plurality of additional structured documents to be inserted into each selected content area of said predetermined template;

iteratively repeating until insertion is valid from a structural viewpoint for each particular selected structural component:

checking whether insertion of said particular structural component selected for the corresponding content area of said predetermined template is valid from a structural viewpoint; and expanding from said selected particular structural component to select a higher structural component based upon the analysis of said structure of said next one of said plurality of additional structured documents if a check indicates that an insertion into its corresponding content area is invalid from a structural viewpoint; and applying said predetermined structural template to said next one of said plurality of additional structured documents so as to insert each validated structural component into the corresponding selected content area of said predetermined template and to include said at least one common area of said predetermined template into said next one of said plurality of additional structured documents.

2. The method according to claim 1, further comprising:
providing a screen image that displays said predetermined graphical template; wherein
analyzing the structure of said predetermined graphical template and identifying at least one content area further comprises:
displaying to a user, a list of content areas determined from analyzing the structure of said predetermined graphical template; and
accepting selection of said at least one content area of said predetermined graphical template from among the displayed content areas included in the predetermined graphical template.

3. The method according to claim 1, wherein:
said analyzing the structure of said predetermined graphical comprises generating first structure information showing the structure of the predetermined graphical template;
said analyzing the structure of said next one of said plurality of additional structured document comprises generating second structure information showing the structure of said next one of said plurality of additional structured documents; and
checking whether insertion of said particular structural component selected for the corresponding content area of said predetermined content is valid from a structural viewpoint further comprises checking whether insertion of each selected structural component into its corresponding identified content area is valid from a structural viewpoint of the document, based on the first and second structure information.

4. The method according to claim 1, wherein expanding from said selected particular structural component comprises determining whether there exists a structural component positioned similarly to the particular structural component included in the analyzed structure information, and wherein no structural component is positioned similarly, further comprising temporarily changing the particular structural component to a different higher-level structural component than the particular structural component, and retrieving a structural component positioned similarly to the different structural component, from among structural components included in the analyzed structure information.

5. The method according to claim 4 further comprising determining whether insertion of the different structural component into the particular content area is valid from a structural viewpoint of the document, and, if it is determined to be valid, a structural component positioned similarly to the different structural component is retrieved from among structural components included in the analyzed structure information.

6. The method according to claim 1, further comprising:
implementing a document pre-selection to select at least a portion of said plurality of additional documents to which said predetermined graphical template is to be applied; and
storing said pre-selected documents in a document storing module;
wherein:
selecting a next one of said plurality of additional structured documents comprises retrieving said next one of said plurality of additional structured documents from said document storing module if said next one of said plurality of additional structured documents is stored in said document storing module.

7. The method according to claim 1, further comprising:
providing a screen image of available graphical templates; and
allowing a user to select said predetermined graphical template from said screen image of graphical templates.

8. The method according to claim 1, wherein:
analyzing the structure of said first structured document so as to identify various structural components of said first structured document comprises:
displaying the structure of said first structured document as an expandable hierarchy; and
selecting a particular structural component of said first structured document to be inserted into each selected content area of said predetermined template comprises:
enabling a user to select structural components from the displayed structure to be inserted into each selected content area of said predetermined template.

9. The method according to claim 1, further comprising:
checking whether the insertion of each select structural component of said first structured document into the corresponding selected content area of said predetermined template is valid from a structural viewpoint.

10. The method according to claim 9, further comprising displaying a warning if an attempt is made to insert a structural component into a corresponding content area that is invalid from a structural viewpoint.

11. The method according to claim 1, wherein:
checking whether insertion of said particular structural component selected for the corresponding content area of said predetermined template is valid from a structural viewpoint comprises determining that insertion is invalid from a structural viewpoint if the corresponding structural component is not found.

* * * * *